United States Patent [19]
Hooper

[11] Patent Number: 5,936,485
[45] Date of Patent: Aug. 10, 1999

[54] RESISTOR-CAPACITOR NETWORK WITH A STRIPE OF RESISTIVE INK ON THE SURFACE OF A WOUND CAPACITOR

[75] Inventor: Geoffrey K. Hooper, Statesville, N.C.

[73] Assignee: Roederstein Electronics, Inc., Statesville, N.C.

[21] Appl. No.: 08/686,338

[22] Filed: Jul. 25, 1996

[51] Int. Cl.⁶ .................................................... H03H 1/02
[52] U.S. Cl. ........................................ 333/172; 361/275.3
[58] Field of Search ........................... 333/172; 361/275.3

[56] References Cited

U.S. PATENT DOCUMENTS

| | | | |
|---|---|---|---|
| 3,427,527 | 2/1969 | Rayburn | 333/172 |
| 3,993,967 | 11/1976 | Saifi | 333/172 |
| 4,423,463 | 12/1983 | Serradimigni | 333/172 X |

FOREIGN PATENT DOCUMENTS

| | | | |
|---|---|---|---|
| 1163434 | 9/1969 | United Kingdom | 333/172 |

OTHER PUBLICATIONS

Cover page and 2 interior pages from a product catalog entitled "Film Capacitors" and bearing the date 1987/88.
Cover page and 2 interior pages from a product catalog entitled "Widerstände Resistors" and bearing the date 1991.

*Primary Examiner*—Robert Pascal
*Assistant Examiner*—Justin P. Bettendorf
*Attorney, Agent, or Firm*—Robert S. Lipton, Esq.; Lipton, Weinberger & Husick

[57] ABSTRACT

A resistor-capacitor network has a wound film capacitor as its capacitive component and, as its resistive component, a stripe of resistive material located on the surface of the spiral laminate which forms the wound film capacitor and extending onto at least one of the schoopage metal terminations of the capacitor. To form a parallel R-C network, the resistive stripe also extends onto the opposite schoopage metal termination. For other network connections, the stripe ends short of one of the metal terminations and is provided with an external connection at that end.

13 Claims, 2 Drawing Sheets

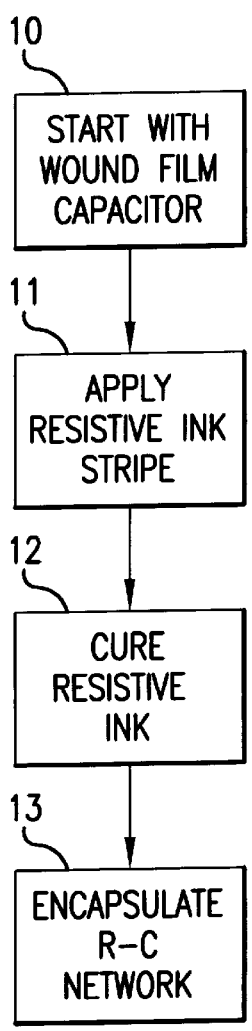
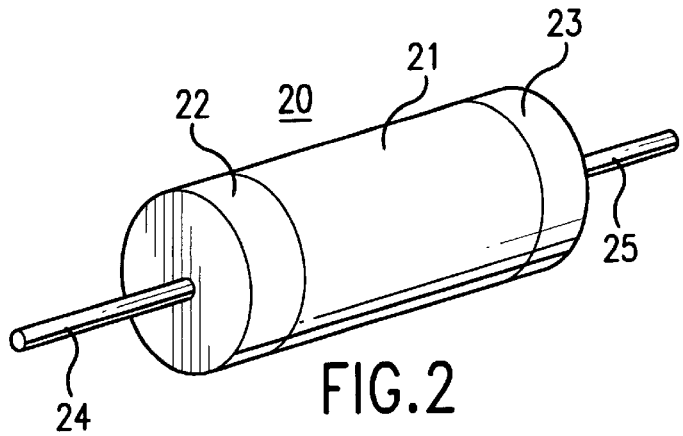
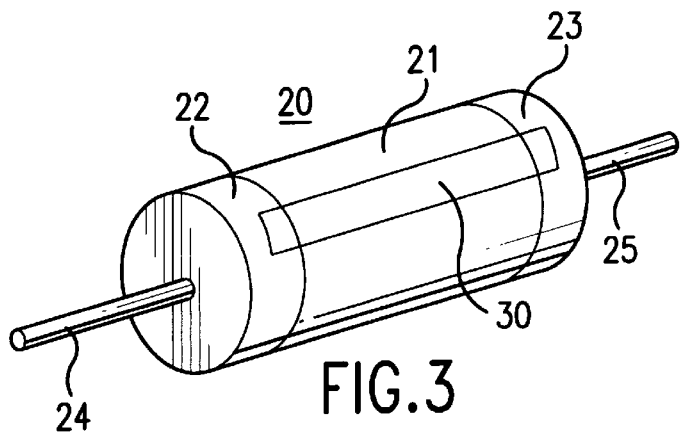
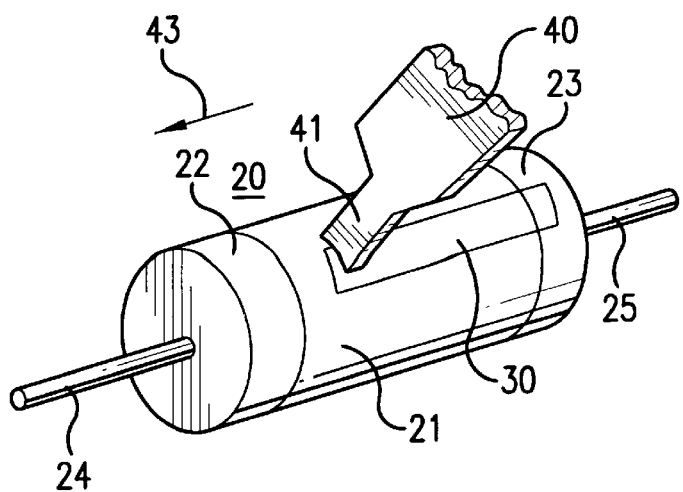

RESISTOR-CAPACITOR NETWORK WITH A STRIPE OF RESISTIVE INK ON THE SURFACE OF A WOUND CAPACITOR

BACKGROUND OF THE INVENTION

The present invention relates to resistor-capacitor (R-C) networks and to the process of manufacturing such networks. More particularly, the invention relates to such networks in which the capacitor is of the kind known as a wound film capacitor.

Wound film capacitors are well known and are routinely manufactured in large quantities. In these capacitors, the plates consist of thin metal films or foils, separated by a plastic film dielectric. The capacitors are referred to as "wound" because the metal-dielectric-metal sandwich is wound into a spiral laminate, thereby providing high values of capacitance in a relatively compact format.

External connecting leads are then attached to the opposite capacitor plates as follows. The metal layers forming the capacitor plates are so positioned that one plate extends all the way out to, or even slightly beyond one end face of the spiral laminate, while the other plate extends to or slightly beyond the opposite end face. Metal, sometimes referred to as "schoopage" metal, is then applied to each end face of the laminate by spraying it on (in molten form), thereby making contact with all the turns of one capacitor plate at one of the end faces and with all the turns of the other capacitor plate at the opposite end face of the spiral laminate. Subsequently, wire connecting leads are welded to these sprayed-on metal contacts.

The resulting assembly is encapsulated, with the connecting wires protruding for connection to other electronic circuit components.

Resistors are, of course, also well known and likewise routinely manufactured in large quantities. In some embodiments, the resistive material is formed into a solid cylindrical body, with wire connecting leads extending from opposite ends of the cylinder. In other embodiments, the resistive material is formed into an elongated path positioned on a separate insulating substrate, connections to other electronic components being made by wire connecting leads attached to opposite ends of the path.

In any case, when such a capacitor and resistor are formed into an R-C network, the total space occupied by the network is, as a minimum, the sum of the space required for each of the components. Indeed, even more space is required to provide room for the connections between resistor and capacitor. Given the powerful trend toward miniaturization of electronic products, this space requirement can readily become burdensome, especially as other electronic components, such as integrated circuits, keep shrinking in size in relation to their functional capabilities.

Accordingly, it is an object of the invention to lessen some of the above-mentioned disadvantages of the prior art.

It is another object to provide an R-C network which requires substantially less physical space than the prior art.

It is another object to provide such a network which occupies a space that is not substantially greater than that of the capacitor alone.

It is another object to provide such a network which requires no additional space for connections between resistor and capacitor.

It is still another object to produce such a network by means of an extremely simple and straightforward process.

SUMMARY OF THE INVENTION

These and other objects which will appear are achieved in accordance with the invention by applying the resistive material constituting the resistive portion of the R-C network directly to the outer surface of the spiral laminate which forms the capacitive portion of the network. Connection between the resistor which is so formed and the capacitor is created by extending the resistive material onto the surface of the schoopage metal at the end(s) of the capacitor. In this way, the space required for the entire R-C network—including its resistive portion, its capacitor portion, and the connection between those—is scarcely larger than the space which would be required by a capacitor alone, having the same characteristics as the capacitor portion of the network.

BRIEF DESCRIPTION OF THE DRAWINGS

For further details, reference is made to the discussion which follows in light of the accompanying drawings wherein:

FIG. 1 is a flow diagram of process steps which characterize the manufacture of R-C networks embodying the present invention; and FIG. 2 illustrates the R-C network embodying the invention at an early step in its manufacture after the cylindrical contacts have been applied at each end;

FIG. 3 illustrates the R-C network of FIG. 2 after a resistive stripe has been deposited connecting the cylindrical contacts;

FIG. 4 illustrates a step in the process of depositing the resistive stripe of FIG. 3;

The illustrations in FIGS. 2 through 7 are all diagrammatic and not to scale. The same reference numerals are used throughout the drawings to denote corresponding elements.

DETAILED DESCRIPTION OF THE PREFERRED EMBODIMENT

Figure 5:
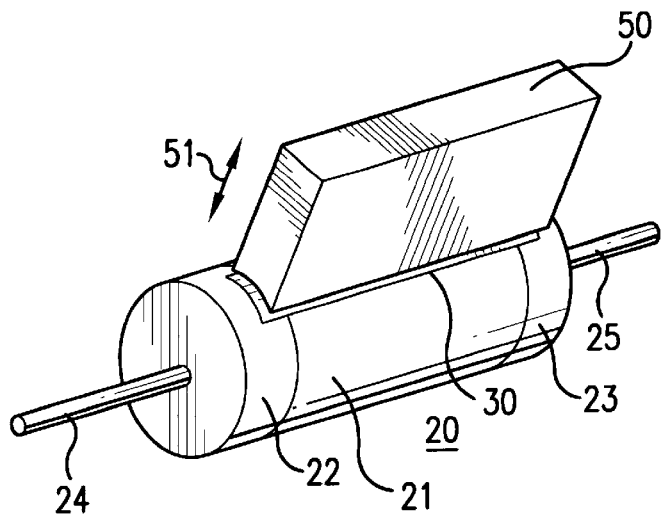
FIG. 5 is an alternative method of applying the resistive stripe of FIG. 3.

Referring to FIG. 1, this indicates by means of block 10 that the process embodying the invention begins at that stage in the manufacture of a wound film capacitor in which the spiral laminate has been formed, schoopage metal has been applied at both ends and the axial connecting leads have been welded-on.

Shown in FIG. 2 is a device 20 which is in that particular state. It has a cylindrical body 21 consisting of the spiral laminate which forms the capacitor itself. At the opposite ends of laminate 21, there are cylindrical extensions 22, 23 formed of schoopage metal sprayed onto the ends of the laminate body 21 and providing the electrical contacts to the respective capacitor plates. Wires 24 and 25 are welded to the respective metal extensions 22 and 23, to serve as connectors to other electronic components.

It should be noted that the spiral laminate 21 which forms the capacitor itself is so configured that its outermost layer is made of insulating material, normally one of the plastic film dielectric layers used to separate the capacitor plates themselves. In contrast, the surfaces of the metal extensions 22, 23 are bare and uninsulated at this stage.

The device 20 has been brought to the state illustrated in FIG. 2 by means of manufacturing techniques which are entirely conventional, and which are therefore not further described or illustrated.

Referring again to FIG. 1, this indicates by means of block 11, that the next step of the process is to apply a stripe of resistive material to the outer surface of device 20.

The device 20, with that resistive stripe applied, is shown in FIG. 3, where the stripe is designated by reference numeral 30.

As shown in FIG. 3, stripe 30 extends lengthwise of cylindrical body 21, and beyond that body itself onto schoopage metal extensions 22 and 23.

FIG. 4 shows one technique for applying stripe 30 to device 20 (FIG. 3). This technique involves utilizing a spatula-like tool 40, having a tip 41 of approximately the desired width of stripe 30, to pick up a quantity of the resistive material of which stripe 30 is to be formed, and then drawing that tip above and along the device 20, so as to leave behind it the stripe 30 deposited on device 20 (FIG. 3). The spatula 40 is shown in fragmentary view in FIG. 4. It is preferably made with the end of its tip 41 curved to conform generally to the cylindrical curvature of device 20, so as to create a substantially uniform deposit of resistive material in the form of stripe 30. A tool which has been found suitable for use as spatula 40 is a medical tongue depressor, whose tip has been shaped as described above and as diagrammatically illustrated in FIG. 4.

In FIG. 4, stripe 30 is shown only partially formed, the deposition of material having started on metal extension 23 and continued along spiral laminate 21 in the direction of arrow 43. This deposition then continues until the stripe 30 is formed to its full length ending on metal extension 22 (FIG. 3). Due to the configuration of device 20 previously described, stripe 30 remains insulated from spiral laminate 21, while making electrical contact with both extensions 23 and 22.

The resistive material of stripe 30 is a so-called resistive "ink". That is the term conventionally applied to a paste of carbon particles. Such inks are available from several manufacturers, with a wide range of physical and electrical (resistive) characteristics. For example, suitable inks are available from the Metech company, whose address is Route 401, P.O. Box 360, Elverson, Pa. 19520.

A particular ink obtainable from that company, which has been found suitable for this invention, is Metech Product PC No. 10783.

In terms of actual dimensions, for cylindrical body 20 a representative length might be ½ inch and a representative diameter 3/16 inch. For stripe 30, a representative thickness would be 2–3 mils. Obviously, this thickness represents an essentially negligible increase in the overall dimensions of the R-C network embodying the invention, over and above the dimensions of the capacitor alone. This contrasts sharply with the prior art, in which the separate resistor and its connections added a bulk comparable to that of the capacitor alone.

As regards the resistance value of stripe 30, this depends, of course, on the thickness and width of the stripe and can be readily determined by measurement. In any case, resistor values in the range of several megohms can be readily obtained. As a general matter, the stripe resistance decreases with increasing thickness, as well as with increasing width of the stripe. These parameters therefore lend themselves to control of that value.

It should be noted that a brush has been found to be less suitable than spatula 40 for applying the resistive stripe 30. The reason is that, if a brush is used, its bristles could subdivide the stripe into separate parallel strips, thereby uncontrollably altering the value of the resistance provided by the stripe as a whole. This does not tend to occur when a bristle-less spatula is used.

For automated application of the resistive stripe 30 to device 20, there may be used conventional transfer pad printing, as is commonly utilized to apply identifying markings to other cylindrical electronic components, such as conventional solid-body resistors. This alternative technique is diagrammatically represented in FIG. 5, where transfer pad 50 is shown as reciprocating up and down in the directions indicated by two-headed arrow 51, leaving behind the stripe 30 as a result of each downward stroke. Between downward strokes, the pad is re-coated with the resistive "ink" in conventional manner. Successive units of device 20 can be automatically brought into position for application of stripe 30 by means of pad 50 in the same manner which is conventionally used in the marking of solid-body resistors.

Referring again to FIG. 1, block 12 indicates that the next step in the process is that of curing the "ink" stripe 30 which had been previously applied, so as to render it firm, and resistant to easy removal from device 20. This is accomplished in conventional manner for the curing of such inks. However, it should be noted that the ink needs to be one which cures at relatively low temperatures, in order to prevent heat damage to the underlying laminate. Inks which also meet this requirement are readily available, including from the above mentioned Metech company.

Figure 6:
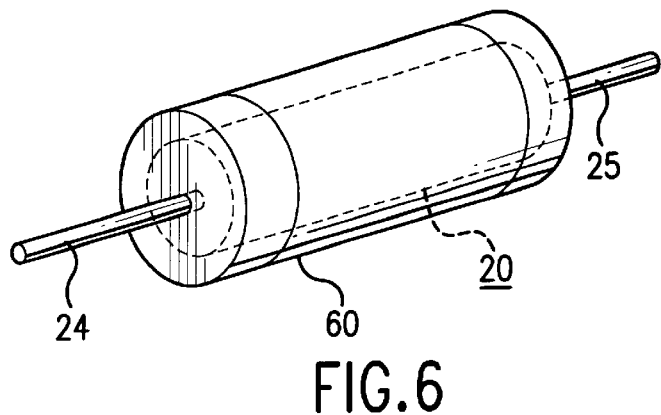
FIG. 6 illustrates the R-C network of FIG. 2 after encapsulation.

Referring once more to FIG. 1, block 13 indicates what is normally the final step in the process, which is to encapsulate the device 20 of FIG. 3, so as to protect it from unwanted external influences. This is done in conventional manner, typically involving first wrapping the device of FIG. 3 in a polyethylene tape 60 as shown in FIG. 6, and then filling the hollows within the tape with potting compound, from which then only the leads 24 and 25 protrude.

It is apparent that the embodiment of the invention shown in FIG. 3 constitutes a parallel R-C network in which the resistive stripe 30 performs, for example, the function of a so-called bleeder resistor for the capacitor formed by spiral laminate 21. Such a bleeder resistor permits electric charges on the plates of the capacitor to dissipate at a controlled rate determined by the time constant of the R-C network.

Figure 7:
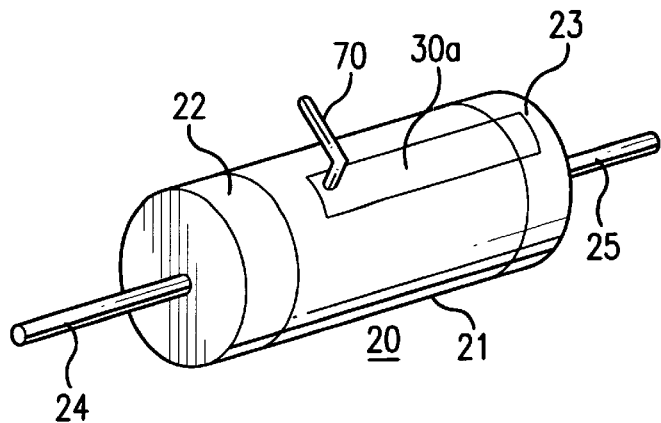
FIG. 7 illustrates an alternate R-C network in which the resistor is not inherently connected in parallel to the capacitor.

However, the invention can also be used for R-C networks in which the resistive and capacitive components are not structurally so related as to be inherently in a parallel relationship. Such an embodiment of the invention is shown in FIG. 7. In that embodiment, the resistive stripe, now designated by reference numeral 30a, is seen to end short of the schoopage extension 22 at one end of the cylinder 21. At that end 70, a connecting wire is attached to the resistive stripe 30a for connecting that (free) end to other electronic components. Thus, the capacitive portion of the network of FIG. 7 is not inherently connected in parallel with the resistive portion. Therefore, it can be connected to other electronic components in any of a variety of other configurations using leads 24, 25 and 70. This embodiment finds application in many other situations, such as R-C filter networks, charge limiters, etc.

Still further modifications will occur to those skilled in the art without departing from the inventive concept. For example, the invention may be used not only with wound film capacitors which have cylindrically-shaped spiral laminates, but it may equally well be used with such capacitors whose spiral laminates have been flattened, into what might be called race-track shape, prior to application of the resistive stripe. In fact, the transfer pad technique described with reference to FIG. 5, above, would be even more readily adapted for use with such flattened capacitors, with the stripe being applied to the flat sides of the spiral laminate.

Accordingly, it is desired that the scope of the invention be limited only by the appended claims.

What is claimed is:

1. A resistor-capacitor network including:
a wound film capacitor assembly having a spiral laminate of capacitor plates, and a schoopage metal termination at each end of the laminate the resistor-capacitor network comprising:
a stripe of resistive ink located on the outer surface of said laminate, and extending onto an exterior surface of at least one of said schooped metal terminations.

2. The network of claim 1 wherein the stripe of resistive ink extends onto both of said metal terminations.

3. The network of claim 1 wherein the stripe of resistive ink ends short of the other one of said metal terminations.

4. The network of claim 3 wherein a lead is attached to the end of the resistive ink which is short of the other metal termination.

5. The network of claim 1 wherein the wound film capacitor assembly further includes a lead projecting from each of the terminations for connection of the network to other electronic components.

6. The network of claim 1 wherein the stripe of resistive ink is made of a resistive ink which is applied to the outer surface of said laminate and cured after application.

7. The network of claim 6 wherein the resistive ink is cured at a temperature which is low enough to prevent injury to the spiral laminate.

8. The network of claim 6 wherein the stripe of resistive ink is applied by means of a spatula.

9. The network of claim 6 wherein the stripe of resistive ink is applied by means of transfer pad printing.

10. A process of producing a resistor-capacitor network comprising the steps of:
   a) providing a spiral laminate capacitor having a first end, a second end, an electrically insulative outermost layer, and first and second electrical contacts at said first and second ends of said capacitor; and
   b) depositing a resistive material on said outermost layer of said capacitor starting at said first contact and terminating at said second contact.

11. The process of claim 10 wherein said resistive material is a resistive ink.

12. A process of producing a resistor-capacitor network comprising the steps of:
   a) providing a spiral laminate capacitor having a first end, a second end, an electrically insulative outermost layer, and first and second electrical contacts at said first and second ends of said capacitor respectively;
   b) depositing resistive material on said outermost layer of said capacitor starting at either electrical contact and terminating at a point before the other electrical contact; and
   c) connecting a lead to said termination point of said resistive material.

13. The process of claim 12 wherein said depositing step c) is performed using a spatula.

* * * * *